United States Patent [19]

Duescher

[11] 4,149,335

[45] Apr. 17, 1979

[54] PROCESS FOR FORMING FISHING LURE COMPONENT AND ARTICLE FORMED THEREBY

[75] Inventor: Wayne O. Duescher, St. Paul, Minn.

[73] Assignee: FisHair, Inc., St. Paul, Minn.

[21] Appl. No.: 804,597

[22] Filed: Jun. 8, 1977

[51] Int. Cl.² ............................................. A01K 85/08
[52] U.S. Cl. ................................... 43/42.53; 156/180;
 43/42.25
[58] Field of Search ................. 43/42.25, 42.28, 42.53,
 43/1, 42.37; 156/180, 212, 215, 218; 300/21

[56] References Cited

U.S. PATENT DOCUMENTS

| | | | |
|---|---|---|---|
| 1,640,599 | 8/1927 | Conn | 156/180 |
| 2,161,094 | 6/1939 | Saunders, Jr. | 43/42.28 |
| 2,365,502 | 12/1944 | Weesner | 43/42.28 |
| 2,753,651 | 7/1956 | Fisher | 43/42.53 |
| 3,017,307 | 1/1962 | Halliburton | 43/42.25 |
| 3,081,976 | 5/1975 | Jones | 156/180 |
| 3,609,789 | 10/1971 | Slater | 300/21 |
| 3,864,864 | 2/1975 | Duescher | 43/42.53 |
| 4,002,787 | 1/1977 | Bailly | 156/218 |

Primary Examiner—William Pieprz
Attorney, Agent, or Firm—Hill, Gross, Simpson, Van Santen, Steadman, Chiara & Simpson

[57] ABSTRACT

A fishing lure component is made by arranging heat-fusible hair-like fiber substantially in a plane, then a heated bar forms a hot flexible bond of the material of the hair-like fiber by which the fibers are bound together, after which the hot flexible bond is wrapped around an elongated member, and is immediately placed with the member in a mold whereby the bond is internally and externally shaped and cooled, the wrapped bond being fully fused together at the ends that extend around opposite sides of the elongated member. The elongated member can form a part of the lure component, or it can be so formed that it can be removed to provide a fishing lure component having hair joined together at one end by a molded tubular common bond of the hair material. During the initial bonding, there is formed on the tooling and the bond a surface which feels waxed to the touch, and in the molding, such surface on the bond is at least partially destroyed to enable the ends of the bond to be joined together during the molding around the elongated member.

9 Claims, 6 Drawing Figures

U.S. Patent
Apr. 17, 1979
4,149,335
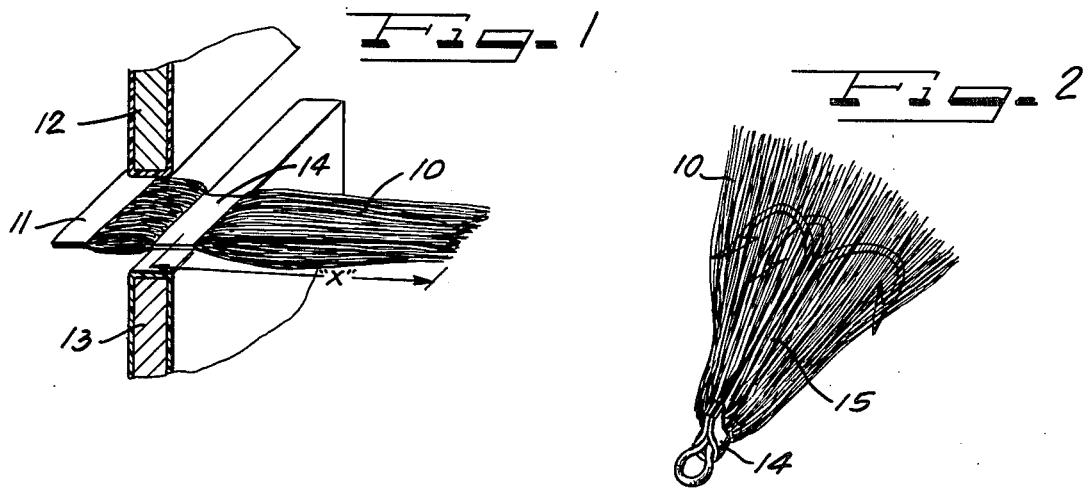
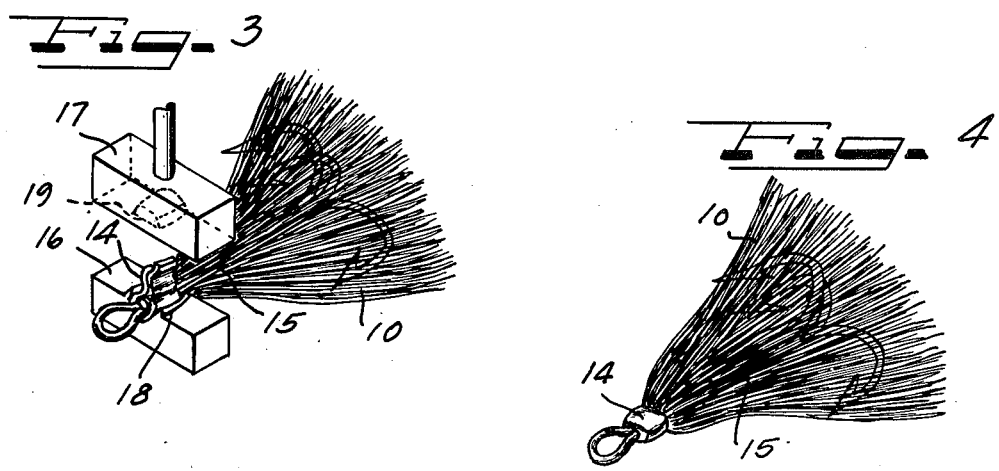
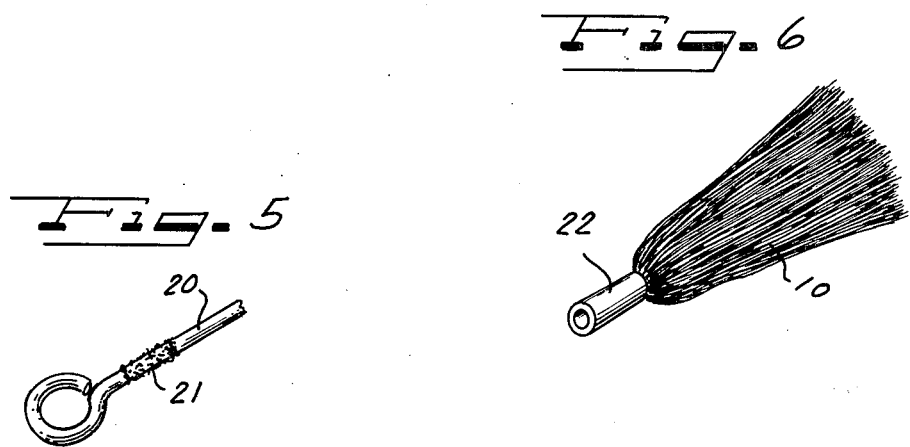

PROCESS FOR FORMING FISHING LURE COMPONENT AND ARTICLE FORMED THEREBY

BACKGROUND OF THE INVENTION

1. Field of the Invention

This invention pertains to a method for making a fishing lure component and a resulting article.

2. Prior Art

Heretofore, fishing lures have included hair-like materials such as bucktail, bear hair, impala, squirrel tail, or thermoplastic fiber hair. These various hairs or fibers have typically been placed on the lure, and the practice has been to use thread to tie such materials to the lure. In use, it has been found that the thread used in tying a lure has been severed by teeth of fishes, and also that the thread has been abraded by rubbing action on rocks. Further, when one or more strands of hair or fiber have been pulled out of the tied lure, there is a gradual or rapid loss of remaining hair strands. Further, hand-tying techniques that have been used commercially have contributed materially to production costs because of the labor. Also, there have been various attempts to cement hair or hair sections onto or into a lure component, and such attempts have been faced with similar difficulties.

SUMMARY OF THE INVENTION

The present invention is directed to the use of heat-fusible material formed as hair-like fiber that is fused together by heat at a relatively closely controlled temperature, such fused-together hair comprising a hot flexible bond which is placed around an elongated member and jointly placed in a mold for reshaping the internal and external contour of the bond the same has cooled to the setting point. Such molding necessitates the use of a force or pressure of such magnitude as to effect not mere engagement of the ends of the bond, but as to effect actual joining of the ends of the bond together.

Accordingly, it is an object of the present invention to overcome the problems that are created by the formation of a film on the surface of the heated common bond.

A further object of the present invention is to provide a re-mold bond which will be structurally strong for keeping the hair fibers attached to the hook or for keeping the hair fibers strongly attached to the lure component.

Another object of the present invention is to provide a method by which certain fishing lure components can be inexpensively produced.

Yet another object of the present invention is to provide a fishing lure component made in accordance with the present invention.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

FIG. 1 is a diagram illustrating the formation of a hot bond;

FIG. 2 illustrates wrapping the hot bond around an elongated member;

FIG. 3 illustrates placing the hot bond and the elongated member jointly in a shaping and cooling mold;

FIG. 4 illustrates the resulting article;

FIG. 5 illustrates an alternate form of elongated member about which the hot bond can be wrapped; and FIG. 6 illustrates a further fishing lure component that can be made using the elongated member of FIG. 5.

AS SHOWN ON THE DRAWINGS

In accordance with the method, a quantity of heat-fusible material formed as hair-like fibers lying in a generally common direction is placed in a substantially flat planar manner as shown in FIG. 1, generally indicated by the numeral 10. The fibers comprise a short length of modacrylic fiber (such as sold under the trademarks Dynel, and Kaneckalon) arranged as a tow or part of a tow. Such fibers may have a previously made brittle bond 11. Such quantity of fibers can constitute a portion of a hair "bundle" broken from a bundle such as illustrated in FIG. 1 of U.S. Pat. No. 3,864,864 issued Feb. 11, 1975, and assigned to the assignee of the present application. Such initial bond may be made as described in U.S. Pat. No. 3,972,760 issued Aug. 3, 1976, a division of the first-mentioned patent.

The bundles normally have hair of a length that is proper for the manufacture of a particular lure component, or that is too long. The bundles normally have a width greater than necessary. As mentioned, a quantity can be broken from the brittle bundle which has enough hairs to make the desired component.

A pair of heated bars 12,13 are provided to reheat or soften the bond 11, such heating being at a temperature of about 375° F. If the desired length "x" of the hair for the lure component is less than that of the bundle, then the hair can be placed between the bars as shown in FIG. 1 so that a new hot flexible narrow planar bond of the hair material is formed as shown at 14 and which extends transversely to the fibers and lies in the plane of the hair or material 10. If a heating bar is utilized as shown in the above-mentioned patents, then there will be automatic severance along the length of the bond 14. On the other hand, any other form of trimming away the excess material may be utilized while the bond 14 is still hot. The heated bars 12,13 perform their heating while the hair is compressed or clamped therebetween.

After any necessary trimming has been completed, the hot flexible bond 14 is wrapped around an elongated member, such elongated member here constituting the shank of a treble hook 15. As there are two or three wires in the shank 15, the portion of the hook that is surrounded by the hot band 14 is noncircular in cross-section, taken as a whole.

With the hot bond 14 in place around the shank 15, the bond with its hair and the shank are jointly immediately placed into a mold shown in FIG. 3, there typically being a lower portion 16 which is fixedly supported and a movable portion 17. If desired, the mold portions 16,17 may be provided with cutting edges 18,19 to trim away any excess thermoplastic material. The mold halves 16,17 are then brought together, preferably with an impact and with a substantial pressure, the pressure being typically in excess of 1000 psi. The mold halves 16,17 are not of themselves heated, and they provide a shaping function to the outside of the bond, and because of reaction by the elongated member 15, the interior of the re-molded bond is also determined. The mold 16,17 is held closed until it has chilled the bond so that it is no longer flexible. Because of the configuration of the cross-section of the elongated member, the molded bond is securely affixed to such elongated member or lure component.

In working with this method, I have found that the bond 11 and the bond 14, as a consequence of the heating described, acquire a film thereon which is waxy to the touch, and the material of this film also adheres to certain tooling that has been used. It is therefore believed that such film is a decomposition product of the material of which the synthetic thermoplastic hair is made. This film forms a barrier that tends to prevent the joining together of the ends of the bond 14 that are shown adjacent to each other in FIG. 2. However, when there is sufficient temperature, pressure, and movement within the die, part of which comes as a consequence of impact on closing the die, such film appears to be adequately broken so that the material beneath the film at the opposite ends of the bond can in fact join together and be as strong as other parts of the original bond.

Where the elongated member is to comprise a single element 20 of circular cross-section, it then becomes desirable to provide some form of roughness 21 on the surface. For example, such roughness could be provided as an adhesive. On the other hand, when the roughness 21 is omitted, the elongated element 20 can constitute a highly polished mandrel to which the molded bond will not stick, and because of the waxy surface of the interior of the resulting tubular bond 22, FIG. 6, the molded component will readily slip off the mandrel 20 to provide an alternate form of fishing lure component. The film inherently has a low coefficient of friction which not only facilitates the removal of the component of FIG. 6 from the mandrel of FIG. 5, but which has a utility in use. The article of FIG. 6 is slipped over a fishing line and it is permitted to slide therealong until it reaches some other component near the end of the line that blocks further movement. If the hook-end of the line extends from the end where the hair is joined, the hair will tend to flow backward in use over whatever element is there in abutting relation, for example a swivel (not shown). If the lure component of FIG. 6 is put on in the other direction, then the hair tends to form a cone that fans out and forms a larger diameter effect in the water.

If desired, the molded portion of the article of FIG. 4 or the molded portion of the article of FIG. 6 may be covered with an epoxy-base paint. If painting is desired, it should be kept in mind that the film on the molded bond will prevent the adherence of most paints, but a paint having the adherence-property of an epoxy-base paint should therefore be used.

Although the invention can be practiced optionally beginning with an amount of loose hair fiber cut to proper length, it is more convenient to manufacture the lures beginning with the article of U.S. Pat. No. 3,864,864 as a starting material. A typical area that would be heated in the step of FIG. 1 would be three-eighths inch along the length of the hair and three-fourths inch along the length of the heater bars. If so, by trimming, the ⅜ inch dimension can be reduced to 3/16 inch. The dimension "x" typically is on the order of two inches.

The nature of the apparent break-down of the modacrylic fiber is not fully understood, but the effect thereof and the manner of overcomming such effect is adequately set forth herein. The scrubbing action of the heated bond within the mold is one of the factors that disrupts such film to enable formation of the bond-to-bond joint. Thus the result is a uniform forgewelded, integral common material head. The avoidance of weakness at such joint is essential to provide the necessary structural strength.

The resulting articles have molded bonds that cannot be adversely effected by the teeth of fish or by the rubbing action on rocks, and any loss of a few strands of hair or fibers has no effect whatever on the integrity or strength of the molded bond.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A method of making a fishing lure component comprising:
   (a) arranging a quantity of heat-fusible material formed as hair-like fiber lying in a generally common direction in a substantially flat planar manner, the fiber being joined together by a previously formed brittle bond of the material;
   (b) by means of at least one heated bar applied transversely to one side of the material adjacent to the brittle bond, simultaneously clamping and heating the material to form a hot flexible narrow planar bond of said material and extending transversely to the fibers and lying in the plane of the material and thereafter trimming away the brittle bond;
   (c) wrapping said hot flexible bond once around an elongated member so that the ends of the flexible bond engage each other, and immediately placing said hot bond, with said member still in place, in a mold having a bond engaging surface temperature less than the setting temperature of said material;
   (d) by means of said mold acting externally on said bond and said elongated member reacting internally on said bond, applying a pressure to said bond of such magnitude as to join the ends of said bond together; and
   (e) thereafter cooling said bond.

2. A method of making a fishing lure component, comprising:
   (a) arranging a quantity of heat-fusible material formed as hair-like fiber lying in a generally common direction in a substantially flat planar manner;
   (b) by means of at least one heated bar applied transversely to one side of the material, simultaneously clamping and heating the material to form a hot flexible narrow planar bond of said material and extending transversely to the fibers and lying in the plane of the material;
   (c) wrapping said hot flexible bond once around an elongated member, which has a roughened surface about which the flexible bond is wrapped, so that the ends of the flexible bond engage each other, and immediately placing said hot bond, with said member still in place, in a mold having a bond engaging surface temperature less then the setting temperature of said material;
   (d) by means of said mold acting externally on said bond and said elongated member reacting internally on said bond, applying a pressure to said bond of such magnitude as to join the ends of said bond together; and
   (e) thereafter cooling said bond.

3. A method of making a fishing lure cpmponent, comprising:
   (a) arranging a quantity of heat-fusible material formed as hair-like fiber lying in a generally common direction in a substantially flat planar manner;
   (b) by means of at least one heated bar applied transversely to one side of the material, simultaneously clamping and heating the material to form a hot flexible narrow planar bond of said material and extending transversely to the fibers and lying in the plane of the material;
   (c) wrapping said hot flexible bond once around an elongated member so that the ends of the flexible bond engage each other, and immediately placing said hot bond, with said member still in place, in a mold having a bond-engaging surface temperature less than the setting temperature of said material;
   (d) by means of said mold acting externally on said bond and said elongated member reacting internally on said bond, applying a pressure to said bond of such magnitude as to join the ends of said bond together and to form a slidable connection between said molded bond and said elongated member; and
   (e) thereafter cooling said bond and removing said elongated member endwise from the molded bond.

4. A method of making a fishing lure component, comprising:
   (a) arranging a quantity of heat-fusible material formed as hair-like fiber lying in a generally common direction in a substantially flat planar manner;
   (b) by means of at least one heated bar applied transversely to one side of the material, simultaneously clamping and heating the material to form a hot flexible narrow planar bond of said material and extending transversely to the fibers and lying in the plane of the material;
   (c) wrapping said hot flexible bond once around an elongated member so that the ends of the flexible bond engage each other, and immediately placing said hot bond, with said member still in place, in a mold having a bond-engaging surface temperature less than the setting temperature of said material;
   (d) by means of said mold acting externally on said bond and said elongated member reacting internally on said bond, applying a pressure to said bond of such magnitude as to join the ends of said bond together, including using said mold to trim away any remaining surplus heated bond material; and
   (e) thereafter cooling said bond.

5. A method of making a fishing lure component, comprising:
   (a) arranging a quantity of heat-fusible material formed as hair-like fiber lying in a generally common direction in a substantially flat planar manner;
   (b) by means of at least one heated bar applied transversely to one side of the material, simultaneously clamping and heating the material to form a hot flexible narrow planar bond of said material and extending transversely to the fibers and lying in the plane of the material;
   (c) wrapping said hot flexible bond once around an elongated member so that the ends of the flexible bond engage each other, and immediately placing said hot bond, with said member still in place, in a mold having a bond-engaging surface temperature less than the setting temperature of said material;
   (d) by means of said mold, applying an impact to the wrapped bond, thereafter said mold acting externally on said bond and said elongated member reacting internally on said bond in applying a pressure to said bond of such magnitude as to join the ends of said bond together; and
   (e) thereafter cooling said bond.

6. A method of making a fishing lure component, comprising:
   (a) arranging a quantity of heat-fusible material formed as hair-like fiber lying in a generally common direction in a substantially flat planar manner;
   (b) by means of at least one heated bar applied transversely to one side of the material, simultaneously clamping and heating the material to form a hot flexible narrow planar bond of said material and extending transversely to the fibers and lying in the plane of the material;
   (c) trimming the heated flexible bond to a desired size;
   (d) thereafter wrapping said hot flexible bond once around an elongated member so that the ends of the flexible bond engage each other, and immediately placing said hot bond, with said member still in place, in a mold having a bond-engaging surface temperature less than the setting temperature of said material;
   (e) by means of said mold acting externally on said bond and said elongated member reacting internally on said bond, applying a pressure to said bond of such magnitude as to join the ends of said bond together; and
   (f) thereafter cooling said bond.

7. A method of making a fishing lure component, comprising:
   (a) arranging a quantity of heat-fusible material formed as hair-like fiber lying in a generally common direction in a substantially flat planar manner;
   (b) by means of at least one heated bar applied transversely to one side of the material, simultaneously clamping and heating the material to form a hot flexible narrow planar bond of said material and extending transversely to the fibers and lying in the plane of the material;
   (c) wrapping said hot flexible bond once around an elongated member so that the ends of the flexible bond engage each other, and immediately placing said hot bond, with said member still in place, in a mold having a bond-engaging surface temperature less than the setting temperature of said material;
   (d) by means of said mold acting externally on said hot bond and said elongated member reacting internally on said hot bond, applying a reshaping pressure to said hot bond of such great magnitude as to reform the shape of said bond into the shape of said mold with no original bond ends being apparent; and
   (e) thereafter cooling said bond.

8. A method according to claim 1 in which the heated bar is applied to a previously formed brittle bond of the material to reheat it.

9. A fishing lure component, comprising:
   a bundle of synthetic thermoplastic hair whose strands lie in a generally common direction, said strands having a molded tubular common bond of the hair at only one end thereof comprising a fusion of the ends of only synthetic hair, said tubular bond having an exposed interior surface of a low coefficient of friction comprising a decomposition product of the molded bond.

* * * * *